United States Patent [19]

Kassai

[11] Patent Number: 4,718,722
[45] Date of Patent: Jan. 12, 1988

[54] CHILD'S SAFETY SEAT FOR USE IN AUTOMOBILES

[75] Inventor: Kenzou Kassai, Osaka, Japan
[73] Assignee: Aprica Kassai Kabushikikaisha, Osaka, Japan
[21] Appl. No.: 932,682
[22] Filed: Nov. 18, 1986
[30] Foreign Application Priority Data
Nov. 29, 1985 [JP] Japan .................. 60-184662[U]
[51] Int. Cl.⁴ ............................................. A47D 7/00
[52] U.S. Cl. .................................... 297/250; 297/216
[58] Field of Search ............................... 297/250, 216
[56] References Cited
U.S. PATENT DOCUMENTS

| | | | |
|---|---|---|---|
| 3,388,947 | 6/1968 | Rosen | 297/250 |
| 3,606,457 | 9/1971 | Reay | 297/216 X |
| 4,231,613 | 11/1980 | Jonasson et al. | 297/250 |
| 4,291,915 | 9/1981 | Cox | 297/216 X |
| 4,348,048 | 9/1982 | Thévenot | 297/250 |
| 4,461,510 | 7/1984 | Cunningham et al. | 297/250 |
| 4,480,870 | 11/1984 | Von Wimmersperg | 297/250 X |

FOREIGN PATENT DOCUMENTS 1478323  6/1977  United Kingdom .............. 297/216

*Primary Examiner*—Peter A. Aschenbrenner
*Attorney, Agent, or Firm*—W. G. Fasse; D. H. Kane, Jr.

[57] ABSTRACT

A child's safety seat for use in automobiles which is adapted to be installed on the seat of an automobile by utilizing the seat belt furnished to the automobile has rings for receiving the seat belt disposed on opposite sides of the front lower end region of the child's safety seat.

3 Claims, 3 Drawing Figures

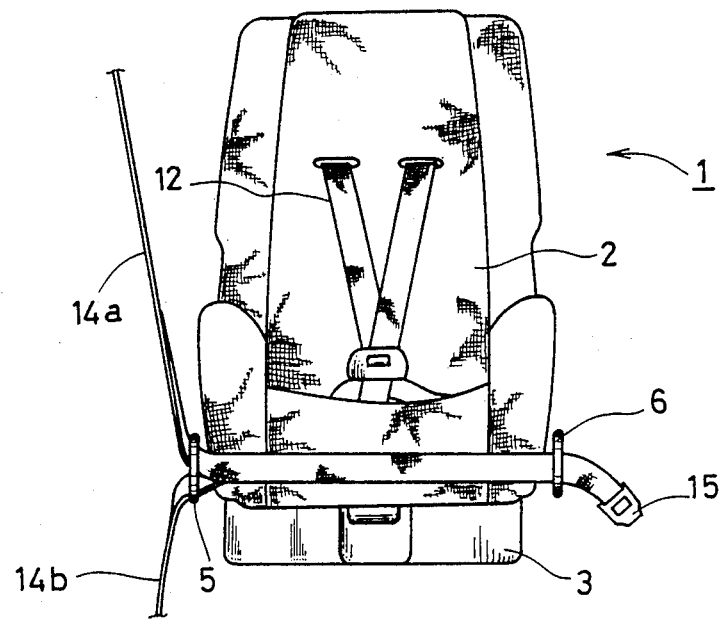
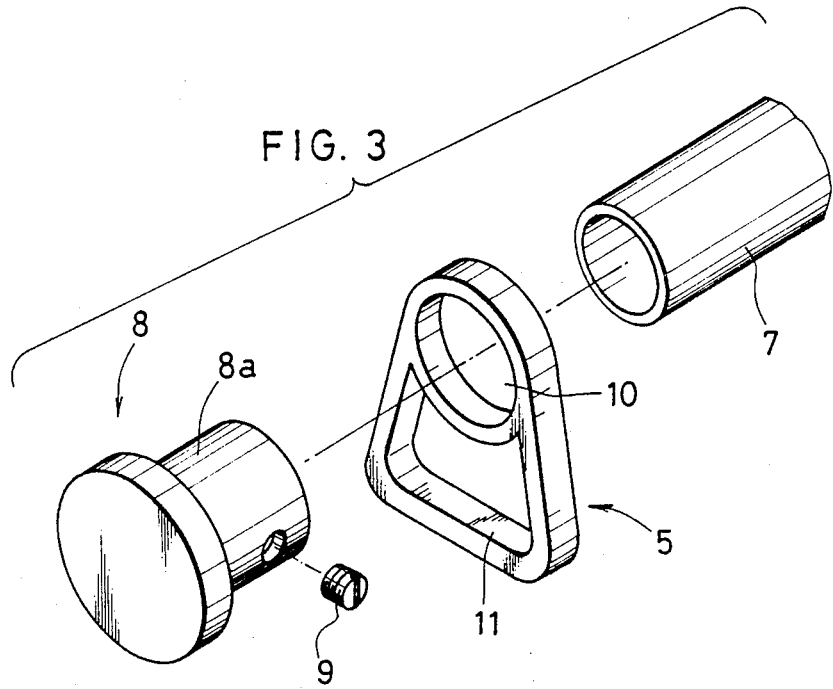

CHILD'S SAFETY SEAT FOR USE IN AUTOMOBILES

BACKGROUND OF THE INVENTION

1. Field of the Invention

This invention relates to a child's safety seat for use in automobiles which ensures the safety of a baby or child sitting in an automobile by retaining the child's body in a fixed position.

2. Description of the Prior Art

This type of child's safety seat for use in automobiles is adapted to be firmly fixed to the seat of an automobile by utilizing the seat belt furnished as part of the automobile. Therefore, the baby's or child's body firmly held by the child's safety seat will remain in the fixed position when the automobile is quickly braked or is going around a sharp curve or even when it is involved in a collision accident. Such safety seats are desirable from the standpoint of safety.

A child's safety seat for use in automobiles is required when a baby or child is sitting in an automobile, but at other times, for example, when only adults ride in the automobile or when baggage is placed on the seat of the automobile, the child's safety seat must be removed. Thus, the child's safety seat for use in automobiles is not always installed in an automobile but it will be mounted or dismounted as needed. For this reason, it is desirable that the mounting and removal of the child's safety seat is as easy as possible.

SUMMARY OF THE INVENTION

Accordingly, it is an object of this invention to provide a child's safety seat for use in automobiles which is easy to mount in and dismount from an automobile, characterized by the provision of rings for receiving a seat belt at opposite sides of the front lower region of said safety seat.

This child's safety seat for use in automobiles is placed, e.g., on the passenger seat so that the safety seat faces in a backward direction. The seat belt extending from the left-hand side of the passenger seat, together with its connector, is passed through the ring attached to the right-hand side of the child's safety seat and then through the ring attached to the left-hand side thereof, whereupon it is connected to the seat belt extending from the right-hand side of the passenger seat. In this manner, the child's safety seat for use in automobiles can be attached very easily to the seat of the automobile, and the operation for removal is also very easy.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a view of the child's safety seat shown in FIG. 1, taken from the back of the passenger seat; and FIG. 3 is a perspective view clarifying the attaching construction of a ring 5 shown in FIGS. 1 and 2.

Figure 1:
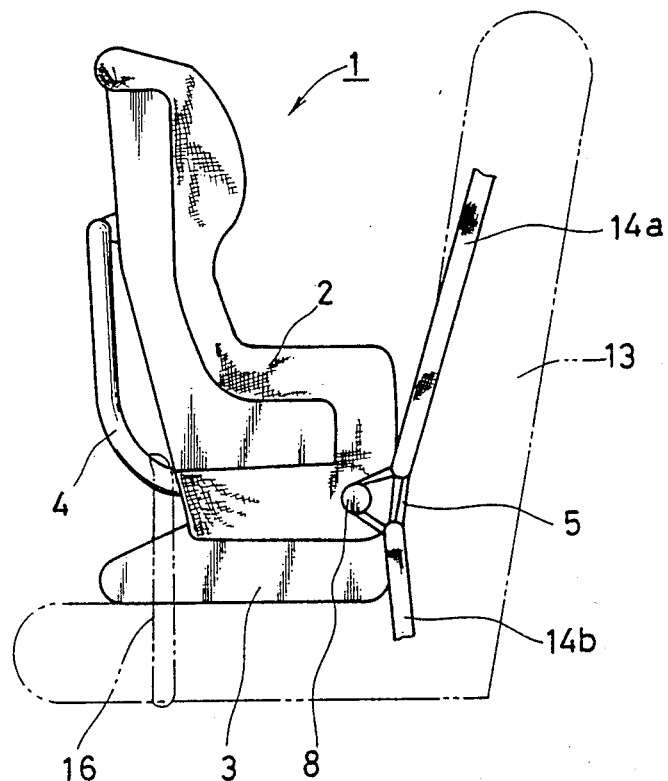
FIG. 1 is a side view showing an embodiment of the invention attached to the passenger seat of an automobile.

DESCRIPTION OF PREFERRED EXAMPLE EMBODIMENTS AND OF THE BEST MODE OF THE INVENTION

A child's safety seat 1 for use in automobiles comprises a seat portion 2 and a base 3 which supports the seat portion 2. The illustrated child's safety seat 1 is of the same construction as that of a child's safety seat disclosed in Japanese Utility Model Application No. 78984/1984 filed by the same applicant as in the present application. The seat portion 2 has an L-shaped frame 4 turnably supported by the base 3. The body of a baby or child seated on the seat portion 2 is firmly held in position by a safety belt 12 shown in FIG. 2.

As is clear from FIGS. 1 and 2, rings 5 and 6 are disposed on opposite sides of the front lower region of the seat portion 2. FIG. 3 clarifies the attaching construction of the ring 5 secured to the right-hand side of the seat portion 2. Referring to FIG. 3, a rigid pipe 7 is disposed in the front lower end region of the seat portion 2. The pipe 7 extends through opposite lateral surfaces of the seat portion. A cap member or bushing 8 is fitted to the right-hand end of the pipe 7. The cap member 8 is held in position by a set screw 9. The left end of the pipe is closed in the same way by a respective cap. The ring 5 has a circular hole 10 which is sufficiently large to receive the cylindrical portion 8a of the cap member or bushing 8, and an insert opening 11 for receiving a seat belt of the automobile. Thus, the ring 5 is rotatably supported on the cylindrical portion 81 of the cap member or bushing 8. The same construction is employed for the ring 6 attached to the left-hand end of the pipe 7 at the other side of the seat portion 2. The bushing 8 has a flange at its free end to restrain an axial movement of the rings 5, 6.

Referring to FIGS. 1 and 2, the child's safety seat 1 is placed on the passenger seat 13 such that the safety seat faces backwardly. The seat belts 14a and 14b extending from the left-hand side of the passenger seat 13, together with the connector 15, are passed first through one ring 5 and then through the other ring 6, whereupon the connector is connected to the seat belt section extending from the right-hand side of the passenger seat 13. In this manner, the attaching operation of the child's safety seat 1 is completed. That seat belts 14a and 14b are sufficient to firmly fasten the child's safety seat 1; however, an auxiliary belt 16 may be provided for more firmly fastening the front and rear of the safety seat 1 to the passenger seat 13. The auxiliary belt 16 may be wrapped around the front seating portion of the passenger seat 13 and around the L-shaped frame 4 of the child's safety seat 1. The auxiliary belt 16 so wrapped is shown in phantom lines in FIG. 1.

The manner of installation of the child's safety seat 1 on the passenger seat 13 such that it faces backward as described above has some advantages. First, if the automobile should be involved in a collision accident, the baby or child seated on the child's safety seat 1 will receive the shock along the entire back, so that any damage will be relatively small. Second, this manner of installation enables in the baby or child to more easily face the driver, whereby both the driver and the baby or child may feel at ease.

However, the illustrated child's safety seat 1 can also be installed on the passenger seat 13 such that it faces forward. In that case, the seat belts 14a and 14b are extended long enough until they pass through the rings 5 and 6. This is possible because the rings 5, 6 can rotate on the pipe caps 7. The illustrated child's safety seat 1 can also be installed on the back seat of the automobile.

In the embodiment described above, the child's safety seat 1 for use in automobiles has been provided with the seat portion 2 and base 3; however, the invention is not limited to such a construction. For example, the invention is equally applicable to a child's safety seat having no base 3.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A child's safety seat for use in an automobile equipped with a seat belt, comprising child support means including a seat portion having a front edge, a rigid elongated member connected to said seat portion substantially along said front edge and having mounting ends protruding on both sides from said seat portion, two ring members (5, 6) each having a round opening (10) and a seat belt opening (11), and means (8) for rotatably mounting one of said ring members with its round opening to one of said protruding mounting ends of said rigid elongated member and for rotatably mounting the other ring member to the other of said protruding mounting end, whereby said seat belt can be passed through said seat belt openings in any rotated position of said ring members.

2. The safety seat of claim 1, further comprising a base (3) for supporting said seat portion, said rigid elongated member passing through said seat portion along said front edge above said base.

3. The safety seat of claim 1, wherein said mounting means comprise, for each ring member, a bushing having an axial hole fitting onto a respective one of said mounting ends, means for rigidly securing said bushing on said mounting end, said bushing further having a cylindrical outer surface on which said round opening (10) of said ring member is rotatably received, said bushing further having an end flange for axially restraining said ring member.

* * * * *